US012768285B1

(12) United States Patent
Eilers et al.

(10) Patent No.: US 12,768,285 B1
(45) Date of Patent: Oct. 20, 2026

(54) RESONATOR SYSTEM FOR COMBUSTOR OF GAS TURBINE SYSTEM

(71) Applicant: GE Vernova Infrastructure Technology LLC, Greenville, SC (US)

(72) Inventors: Bridget Eilers, Greenville, SC (US); Benjamin Crawford Eisman, Greenville, SC (US); Tyler Walton Kasperski, Greer, SC (US); Michael Joseph Jordan, Anderson, SC (US); Layal Hakim, Würenlos (CH)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/247,574

(22) Filed: Jun. 24, 2025

(51) Int. Cl.
*F01D 25/04* (2006.01)
*F01D 21/00* (2006.01)
*F23R 3/42* (2006.01)

(52) U.S. Cl.
CPC ........... *F01D 25/04* (2013.01); *F01D 21/003* (2013.01); *F23R 3/42* (2013.01); *F05D 2260/83* (2013.01); *F05D 2260/963* (2013.01)

(58) Field of Classification Search
CPC .... F23R 3/002; F23R 3/46; F23R 2900/0014; F23R 3/42; F01D 21/003; F01D 25/04; F05D 2260/96; F05D 2260/963; F05D 2260/83
See application file for complete search history.

(56) References Cited

U.S. PATENT DOCUMENTS

| | | | | |
|---|---|---|---|---|
| 8,943,825 | B2 | 2/2015 | Magni et al. | |
| 8,966,903 | B2 | 3/2015 | Bobba et al. | |
| 8,973,365 | B2 | 3/2015 | Corr et al. | |
| 9,988,958 | B2 | 6/2018 | You et al. | |
| 10,473,328 | B2 | 11/2019 | Schilp et al. | |
| 11,041,625 | B2 | 6/2021 | Purcell et al. | |
| 11,131,456 | B2 | 9/2021 | Dyszkiewicz et al. | |
| 11,543,128 | B2 * | 1/2023 | Grooms | F02C 7/18 |
| 11,898,755 | B2 * | 2/2024 | Ganiger | F23R 3/06 |
| 2008/0041058 | A1 * | 2/2008 | Johnson | F23M 20/005 60/725 |
| 2012/0102963 | A1 * | 5/2012 | Corr | F23R 3/002 60/725 |
| 2015/0059345 | A1 * | 3/2015 | Hellat | F23R 3/002 60/725 |

(Continued)

*Primary Examiner* — Rodolphe Andre Chabreyrie
(74) *Attorney, Agent, or Firm* — James Pemrick; Charlotte Wilson; Hoffman Warnick LLC

(57) ABSTRACT

A resonator system for a combustor of a gas turbine system includes a cylindrical member configured to be positioned between an aft end of a fuel nozzle assembly and a forward end of a combustor liner of the combustor. Openings are defined radially through a wall of the cylindrical member adjacent the fuel nozzle assembly. A resonator mount is removably coupled in the opening(s) and includes resonator port(s) in fluid communication with a combustion chamber in the combustor liner. A Helmholtz resonator is removably coupled in the resonator port(s) of the resonator mount and in fluid communication with the combustion chamber in the combustor liner. The Helmholtz resonators can be readily installed and replaced, and they can dampen different preselected frequencies, making the system highly customizable.

16 Claims, 11 Drawing Sheets

(56) References Cited

U.S. PATENT DOCUMENTS

| | | | | |
|---|---|---|---|---|
| 2016/0153661 | A1 * | 6/2016 | Bothien .................... | F23R 3/16<br>60/725 |
| 2017/0167728 | A1 * | 6/2017 | Gonyou .................. | F23R 3/002 |
| 2017/0268777 | A1 | 9/2017 | Hase et al. | |
| 2018/0119958 | A1 * | 5/2018 | Hoffman ................... | F23R 3/60 |
| 2023/0400185 | A1 | 12/2023 | Burbaum | |

* cited by examiner

RESONATOR SYSTEM FOR COMBUSTOR OF GAS TURBINE SYSTEM

The disclosure relates generally to vibration damping in combustors of gas turbine systems. More specifically, the disclosure relates to a resonator system having a cylindrical member with customizable Helmholtz resonators for a combustor of a gas turbine system.

BACKGROUND

Particular combustion systems for gas turbine systems utilize combustors which burn a gaseous or liquid fuel mixed with compressed air. Generally, a combustor includes a head end assembly including multiple fuel nozzles, which provide a mixture of fuel and compressed air to a primary combustion zone or chamber. A combustor may have bundled tube fuel nozzles (also known as micromixer type fuel nozzles) with multiple small tubes for premixing a fuel with compressed air upstream from the combustion zone. The head end assembly, including the fuel nozzles, is at least partially defined by an end cover, a forward plate, an aft plate (also known as a cap plate), and an outer sleeve. Compressed air flows into an inlet portion of each premixing tube within the fuel nozzles. Fuel from, for example, a fuel plenum that surrounds at least a portion of the premixing tubes is injected into each premixing tube, where it premixes with the compressed air before the air-fuel mixture is routed into the combustion zone.

During operation, various operating parameters such as fuel temperature, fuel composition, ambient operating conditions and/or operational load on the gas turbine system may result in combustion dynamics or pressure pulses within the combustor. The combustion dynamics may cause oscillation of various combustor hardware components such as the liner and/or the fuel nozzles, which may result in undesirable wear of those components. Alternatively, or in addition, high frequencies of combustion dynamics may produce pressure pulses inside the fuel nozzles (e.g., micromixers or premixing tubes) and/or combustion chamber that affect the stability of the combustion flame, reduce the design margins for flashback or flame holding, and/or increase undesirable emissions. The dynamics are typically addressed using vibration dampers such as quarter wave resonators or Helmholtz resonators. However, precisely addressing the large range of frequencies of the vibrations and their location can be very challenging. The source of vibrations is also continually changing as advancements in combustor structure and/or materials occur over time.

BRIEF DESCRIPTION

All aspects, examples and features mentioned below can be combined in any technically possible way.

An aspect of the disclosure provides a resonator system for a combustor of a gas turbine system, the resonator system comprising: a cylindrical member configured to be positioned between an aft end of a fuel nozzle assembly and a forward end of a combustor liner of the combustor; a plurality of openings defined radially through a wall of the cylindrical member adjacent the fuel nozzle assembly; a resonator mount configured to be removably coupled in at least one of the plurality of openings defined in the cylindrical member, the resonator mount including at least one resonator port in fluid communication with a combustion chamber in the combustor liner; and a Helmholtz resonator removably coupled in the at least one resonator port of the resonator mount and in fluid communication with the combustion chamber in the combustor liner, the Helmholtz resonator configured to dampen a preselected frequency.

Another aspect of the disclosure includes any of the preceding aspects, and the Helmholtz resonator includes a body defining a damping volume between a first perforated member in fluid communication with the combustion chamber and a second perforated member in fluid communication with a space outside of the combustor liner, wherein the damping volume is configured to dampen the preselected frequency.

Another aspect of the disclosure includes any of the preceding aspects, and the at least one resonator port includes a plurality of resonator ports each including a respective Helmholtz resonator removably coupled therein; and wherein at least two of the Helmholtz resonators have different damping volumes to dampen different frequencies.

Another aspect of the disclosure includes any of the preceding aspects, and the cylindrical member includes a plurality of circumferentially spaced cooling passages extending through the wall thereof and fluidly coupling a source of compressed air outside the combustor liner with the combustion chamber within the combustor liner.

Another aspect of the disclosure includes any of the preceding aspects, and the plurality of openings includes four openings circumferentially spaced around the cylindrical member.

Another aspect of the disclosure includes any of the preceding aspects, and each of the plurality of openings includes a respective resonator mount therein having the Helmholtz resonator in the at least one resonator port thereof.

Another aspect of the disclosure includes any of the preceding aspects, and further comprising a cover plate configured to be positioned in at least one of the plurality of openings to close the opening in the wall of the cylindrical member.

Another aspect of the disclosure includes any of the preceding aspects, and each of the plurality of openings and each resonator mount have mating radially inner and outer cross-sectional areas, wherein radially outer cross-sectional areas of each opening and each resonator mount are larger than radial inner cross-sectional areas of each opening and each resonator mount.

Another aspect of the disclosure includes any of the preceding aspects, and a radially inner surface of the resonator mount is flush with a radially inner surface of the cylindrical member.

Another aspect of the disclosure includes any of the preceding aspects, and the resonator mount is removably coupled in the at least one of the plurality of openings by a threaded fastener threadedly coupled on a threaded post extending radially outward from the cylindrical member adjacent the at least one of the plurality of openings.

Another aspect of the disclosure includes any of the preceding aspects, and the Helmholtz resonator is removably coupled to the resonator mount by a threaded fastener.

Another aspect of the disclosure includes any of the preceding aspects, and the resonator mount includes a plurality of cooling passages therein fluidly coupling a source of compressed air outside the combustor liner with the combustion chamber within the combustor liner.

Another aspect of the disclosure includes any of the preceding aspects, and the cylindrical member further includes a forward portion contiguous with an aft portion, wherein the forward portion is configured to be positioned around the fuel nozzle assembly, and the aft portion extends between the forward portion and the combustor liner.

Another aspect of the disclosure includes any of the preceding aspects, and the cylindrical member is one of: fixedly coupled to the combustor liner and additively manufactured with the combustor liner.

Another aspect of the disclosure includes any of the preceding aspects, and the at least one resonator port and the Helmholtz resonator have mating rectangular inner and outer cross-sectional shapes, the rectangular inner and outer cross-sectional shapes having a length thereof extending in a circumferential direction of the cylindrical member.

Another aspect of the disclosure includes any of the preceding aspects, and the at least one resonator port includes a plurality of resonator ports in the resonator mount in fluid communication with the combustion chamber in the combustor liner, wherein the plurality of resonator ports are longitudinally spaced on the resonator mount.

Another aspect of the disclosure includes any of the preceding aspects, and the Helmholtz resonator is telescopically slidable into the at least one resonator port of the resonator mount.

Another aspect of the disclosure includes any of the preceding aspects, and further comprising: a resonator test mount configured to be positioned in at least one of the plurality of openings defined in the wall of the cylindrical member, the resonator test mount including at least one acoustic probe port in fluid communication with the combustion chamber in the combustor liner; and an acoustic probe removably coupled in the at least one acoustic probe port of the resonator test mount, the acoustic probe configured to identify the preselected frequency to be dampened at a location of the at least one acoustic probe port in which the acoustic probe is removably coupled.

Another aspect of the disclosure includes any of the preceding aspects, and further comprising a cover plate removably coupled in the at least one of the plurality of openings to close the opening in the wall of the cylindrical member.

Another aspect of the disclosure includes a combustor including the resonator system of any of the preceding aspects.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
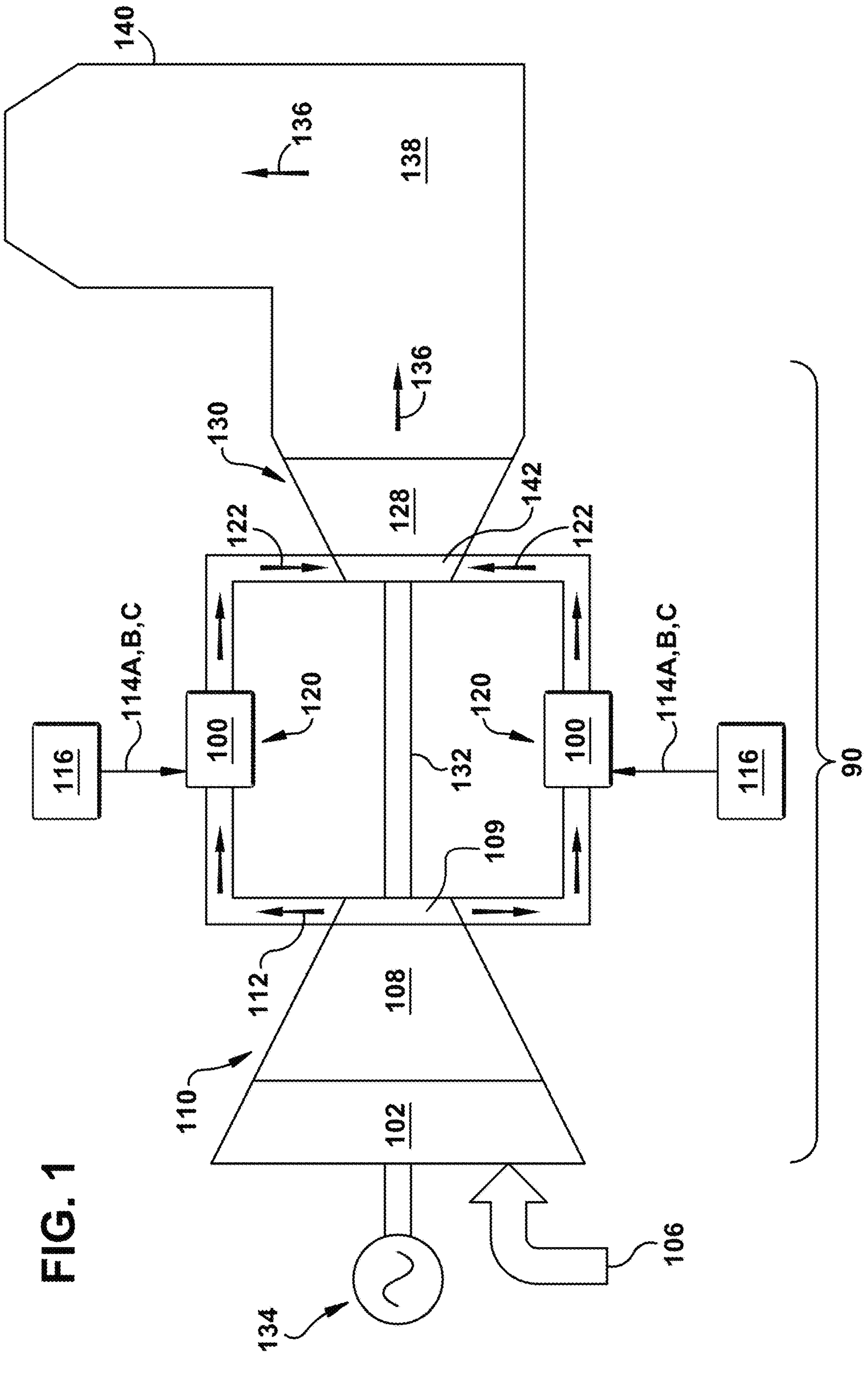
FIG. 1 shows a functional block diagram of an illustrative gas turbine system capable of use with a combustor including a resonator system, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a combustor for a gas turbine system and related resonator system therefor. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms.

What may be described herein as being a single part may include and be referenced in another context as consisting of multiple components. Alternatively, what may be described herein as including multiple components may be referred to elsewhere as a single part.

In addition, several descriptive terms may be used herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through a combustor of the turbomachine or, for example, the flow of air or fuel through the combustor or parts thereof like fuel nozzles or a cap assembly, etc., or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine or combustor, and "aft" referring to the rearward or turbine end of the turbomachine or combustor.

The term "axial" refers to movement or position parallel to an axis, e.g., an axis of a resonator, a combustor, or a gas turbine. The term "radial" refers to movement or position perpendicular to an axis, e.g., an axis of a resonator, a combustor, or a gas turbine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component.

Finally, the term "circumferential" refers to movement or position around an axis, e.g., a circumferential interior surface of a combustor liner or a circumferential interior of casing extending about a combustor. As indicated above, and depending on context, it will be appreciated that such terms may be applied in relation to the axis of, for example, a resonator, a cylindrical member of a resonator system, a combustor, or a turbine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As noted, during operation, various operating parameters such as fuel temperature, fuel composition, ambient operating conditions and/or operational load on the gas turbine system may result in combustion dynamics or pressure pulses within the combustor. The combustion dynamics may cause oscillation of various combustor hardware components such as the combustor liner and/or the fuel nozzles, which may result in undesirable wear of those components. Alternatively, or in addition, high frequencies of combustion dynamics may produce pressure pulses inside the fuel nozzles (e.g., micromixers or premixing tubes) and/or combustion chamber that affect the stability of the combustion flame, reduce the design margins for flashback or flame holding, and/or increase undesirable emissions. The dynamics are typically addressed using vibration dampers such as quarter wave resonators or Helmholtz resonators. However, precisely addressing the large range of frequencies of the vibrations and their location can be very challenging. For example, in certain combustors, there may be several high amplitude frequencies directly downstream of the aft face of the cap assembly, but the exact location of these modes is unknown and will likely change as future generations of the fuel nozzles in the cap assembly are developed.

In order to address these challenges, among other issues, embodiments of the disclosure include a resonator system for a combustor of a gas turbine (GT) system. The resonator system includes a cylindrical member configured to be positioned between an aft end of a fuel nozzle assembly and a forward end of a combustor liner of the combustor. A plurality of openings are defined radially through a wall of the cylindrical member adjacent the fuel nozzle assembly, and a resonator mount is configured to be removably coupled in at least one of the plurality of openings defined in the cylindrical member. The resonator mount includes at least one resonator port in fluid communication with a combustion chamber in the combustor liner. The resonator system also includes a Helmholtz resonator configured to be removably coupled in the at least one resonator port of the resonator mount and in fluid communication with the combustion chamber in the combustor liner. Each Helmholtz resonator is configured to dampen a preselected frequency, e.g., by having a different damping volume or structural configuration.

In one example benefit, the Helmholtz resonators can be readily installed and replaced, and they can dampen different preselected frequencies, making the system highly customizable. In this manner, in another example, if new dynamic tones begin to appear, for example, in the area on the combustor liner and around the fuel nozzles, the plug-and-play style of the Helmholtz resonators will allow those tones to be addressed without having to perform a major redesign. The resonator system also may include cover plates to fill the openings where no vibration damping is required, increasing its flexibility. In another example, the openings in the cylindrical member (and cooling passages therein and in the resonator mount) allow placement of Helmholtz resonators where they previously were unable to operate or fit. In another example benefit, the resonator system may also include an acoustic probe mount for positioning acoustic (testing) probes in the openings to identify frequencies to be damped at various locations.

FIG. 1 shows a functional block diagram of an illustrative gas turbine (GT) system 90 that may incorporate various embodiments of a combustor 100 and a resonator system 200 (FIGS. 2-5) of the present disclosure. As shown, GT system 90 generally includes an inlet section 102 that may include, for example, a series of filters, cooling coils, moisture separators, and/or other devices to purify and otherwise condition air 106 entering GT system 90. Air 106 flows to a compressor 108 in a compressor section 110 that progressively imparts kinetic energy to air 106 to produce a compressed, high-pressure (HP) air 112 (hereafter "HP air 112" or "compressed air 112") at a highly energized state. HP air 112 is typically mixed with one or more fuels, e.g., fuel 114A, fuel 114B and/or fuel 114C, from a fuel source(s) 116 to form a combustible mixture within at least one combustor 100 in a combustion section 120 that is operatively coupled to compressor section 110. Fuels 114A-C may include but are not limited to natural gas, fuel oil, hydrogen and ammonia. The combustible mixture ignites to produce combustion gases 122 having a high temperature and pressure. Combustion gases 122 flow through a turbine 128 (e.g., an expansion turbine) of a turbine section 130 operatively coupled to combustion section 120 to produce work. For example, turbine 128 may be connected to a shaft 132 so that rotation of turbine 128 drives compressor 108 to produce HP air 112. Alternatively, or in addition, shaft 132 may connect turbine 128 to another load, such as a generator 134 for producing electricity. Exhaust gases 136 from turbine 128 flow through an exhaust section 138 that connects turbine 128 to an exhaust stack 140 downstream from turbine 128. Exhaust section 138 may include, for example, a heat recovery steam generator ("HRSG," not shown) for cleaning and extracting additional heat from exhaust gases 136 before release to the environment. Where more than one combustor 100 is used, they may be circumferentially spaced around a turbine inlet 142 of turbine 128.

In one embodiment, GT system 90 may be applicable to an engine model commercially available from GE Vernova of Cambridge, MA including, for example, any HA, F, B, LM, GT, TM and E-class engine models. The present disclosure is not limited to any one particular GT system and may be implemented in connection with other turbine engines or engine models of other companies. Furthermore, the present disclosure is not limited to any particular turbomachine, and may be applicable to, for example, steam turbines, jet engines, compressors, turbofans, etc.

Figure 2:
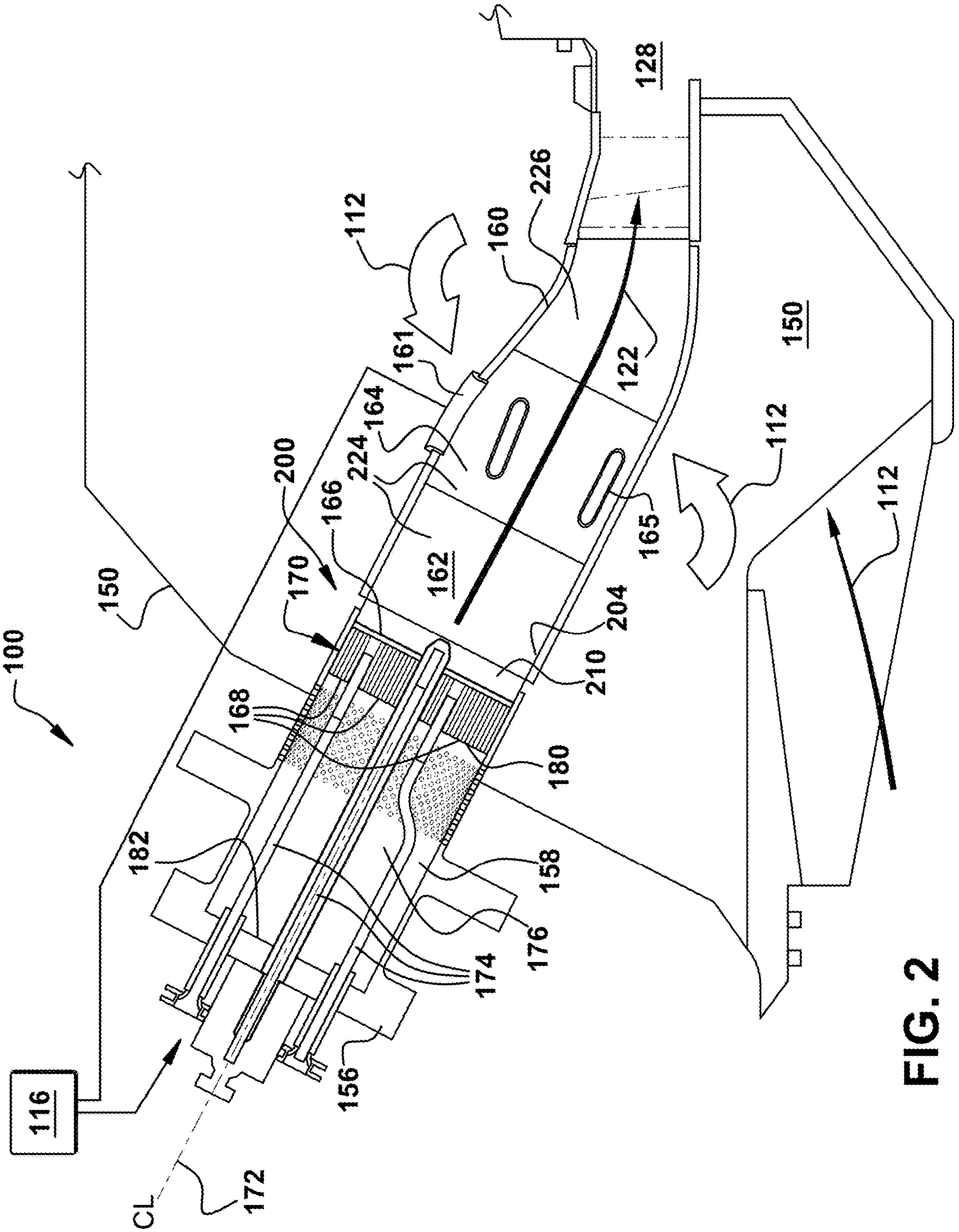
FIG. 2 shows a cross-sectional side view of a combustor including a resonator system, according to embodiments of the disclosure.

An illustrative combustor 100 usable within GT system 90 will now be described. FIG. 2 shows a cross-sectional side view of an illustrative combustor 100 positioned within GT system 90 (FIG. 1). As will be further described herein, combustor 100 may include a resonator system 200 according to embodiments of the disclosure. While an illustrative combustor 100 will be described herein, it is emphasized that resonator system 200 according to embodiments of the disclosure may be used in a large variety of different types of combustors 100. Hence, the teachings of the disclosure are not limited to any particular combustor.

As shown in FIG. 2, combustor 100 may be at least partially surrounded by an outer casing 150 such as a compressor discharge casing. Outer casing 150 may at least partially define a high pressure plenum 152 that at least partially surrounds various components of combustor 100. High pressure plenum 152 may be in fluid communication with compressor 108 (FIG. 1) so as to receive compressed air 112 therefrom. An end cover 156 may be coupled to outer casing 150. In certain embodiments, a forward portion of outer casing 150 and end cover 156 may at least partially define a head end volume or portion 158 of combustor 100.

In certain embodiments, head end portion 158 is in fluid communication with high pressure plenum 152 and/or compressor 108 (FIG. 1). One or more combustor liners or ducts 160 may at least partially define a combustion chamber or zone 162 for combusting the fuel-air mixture and/or may at least partially define a hot gas path 164 through combustor 100 for directing combustion gases 122 towards an inlet to turbine 128.

In various embodiments, combustor 100 includes a cap assembly 166 including a plurality of premixing tubes 168, collectively forming one or more fuel nozzles in a fuel nozzle assembly 170. As shown in the cross-sectional view of combustor 100 in FIG. 2, fuel nozzle assembly 170 is disposed within outer casing 150 downstream from and/or axially spaced from end cover 156 with respect to axial centerline 172 of combustor 100 and upstream from combustion chamber 162. In particular embodiments, fuel nozzle assembly 170 is in fluid communication with a fuel supply 116 via one or more fluid conduits 174. In certain embodiments, fluid conduit(s) 174 may be fluidly coupled and/or connected at one end to or through end cover 156. It should be understood that fuel nozzle assembly 170 and/or fluid conduit(s) 174 may be mounted to structures other than end cover 156 (e.g., the outer casing 150). Fuel from fuel supply 116 may also be provided to fuel injectors 161 that are axially downstream from fuel nozzle assembly 170. In some embodiments, fuel injectors 161 may be mounted to bosses 163 (FIG. 3) on combustor liner 160 (e.g., on an outer flow sleeve thereof) and may direct a fuel-air mixture through openings 165 (FIG. 2) in combustor liner 160 to create a secondary combustion zone within combustion chamber 162. Openings 165 may be any size, shape, or number to accommodate the style and quantity of fuel injectors being used.

Compressed air 112 from high pressure plenum 152 may be routed to an air plenum 176 upstream of fuel nozzle assembly 170, e.g., between a forward end 180 of cap assembly 166 and an aft end 182 of end cover 156. Fuel(s) 114A-C may be routed to premixing tubes 168 of the fuel nozzle(s) through end cover 156 in any now known or later developed manner, e.g., fluid conduit(s) 174 or other mechanisms. Premixing tubes 168 may take any now known or later developed form such as but not limited to bundled tube fuel nozzles or micromixers. As illustrated, a plurality of premixing tubes 168 are arranged/bundled in cap assembly 166. As shown in FIG. 2, resonator system 200 for combustor 100 of GT system is positioned, at least partially, between an aft end 202 of fuel nozzle assembly 170 and forward end 204 of combustor liner 160 of combustor 100.

Figure 3:
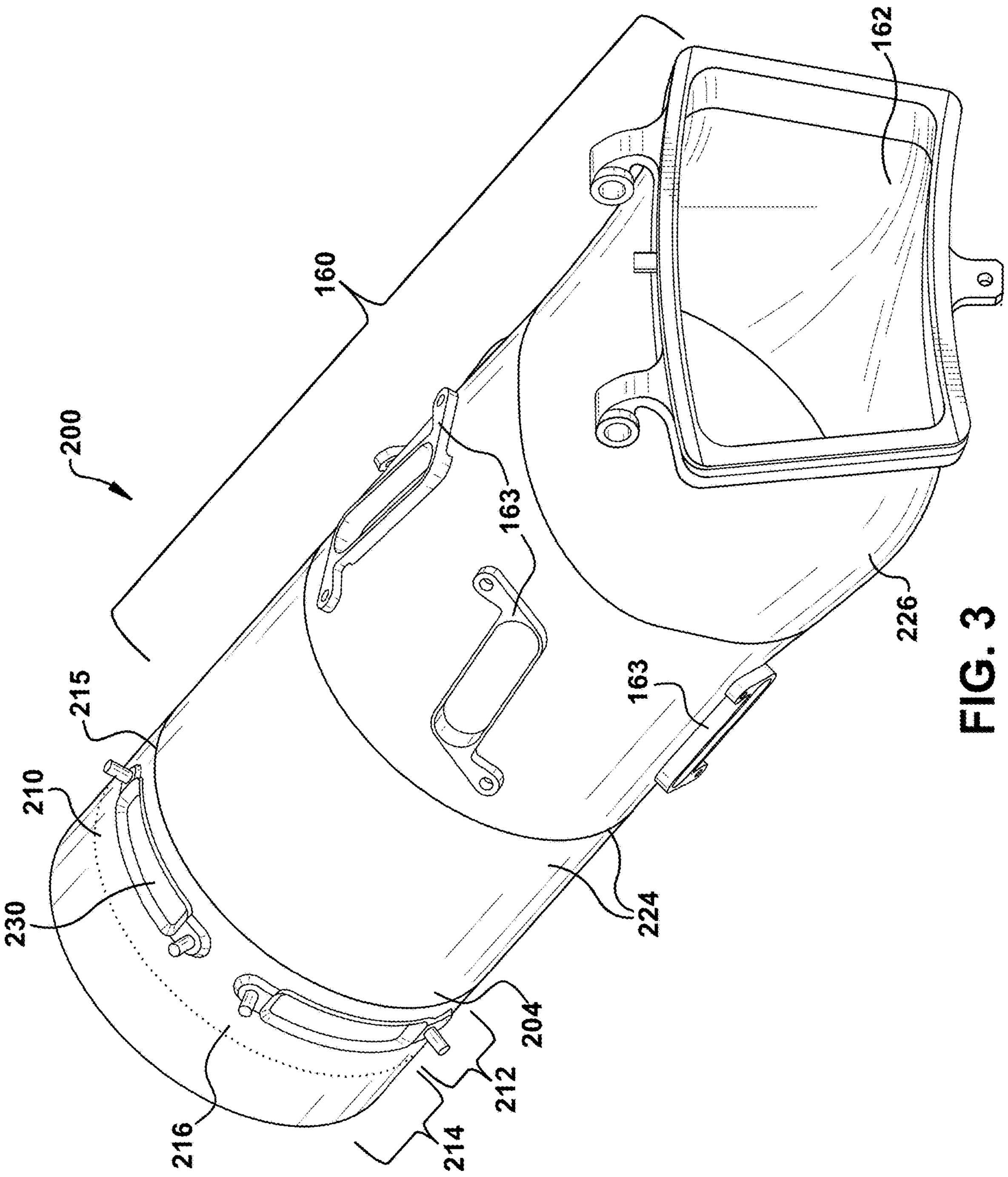
FIG. 3 shows a perspective view of a combustor liner and parts of a resonator system (with fuel nozzle assembly removed), according to embodiments of the disclosure.
Figure 4:
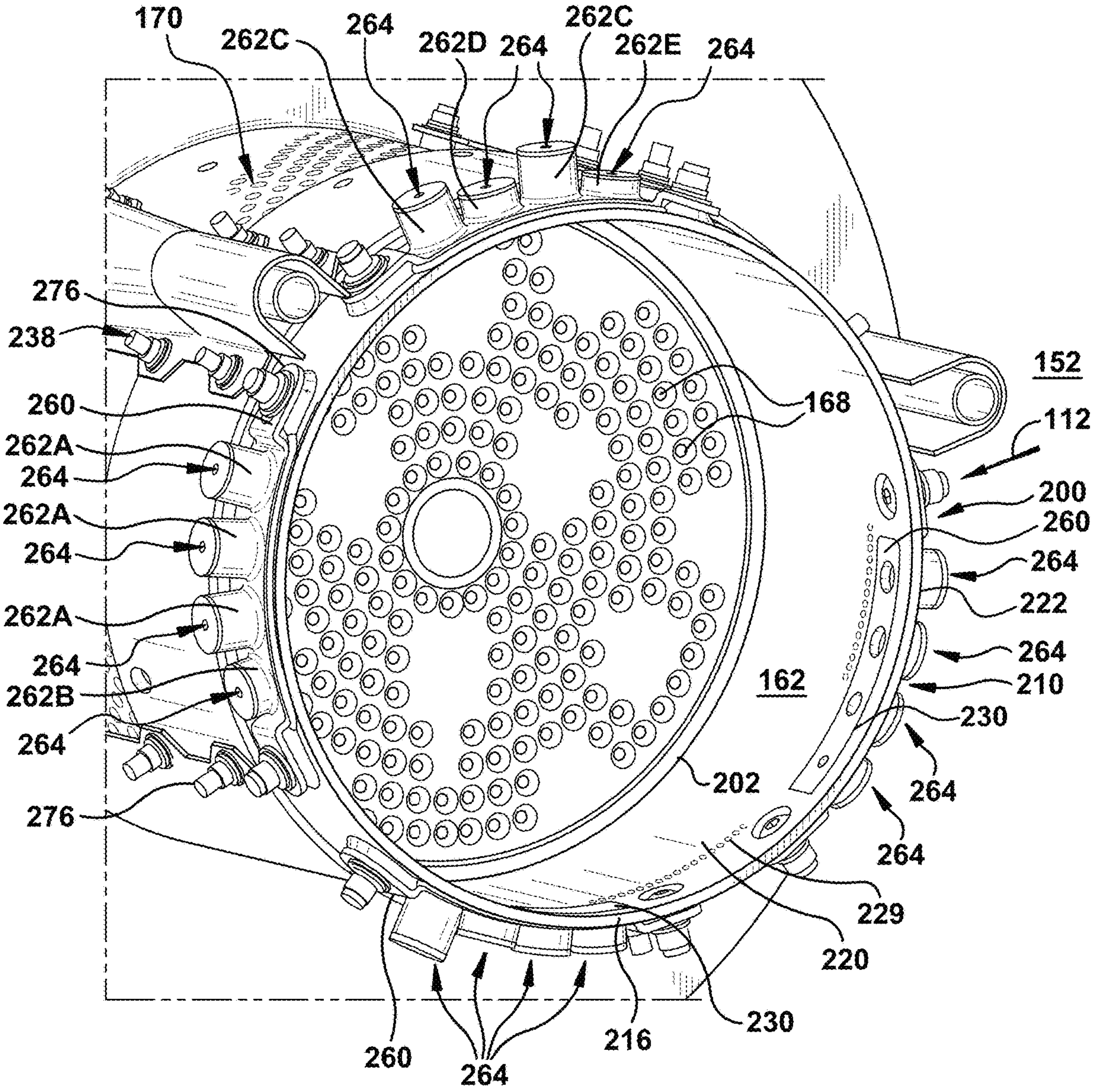
FIG. 4 shows a perspective view of a resonator system (with fuel nozzle assembly and combustor liner removed), according to embodiments of the disclosure.
Figure 5:
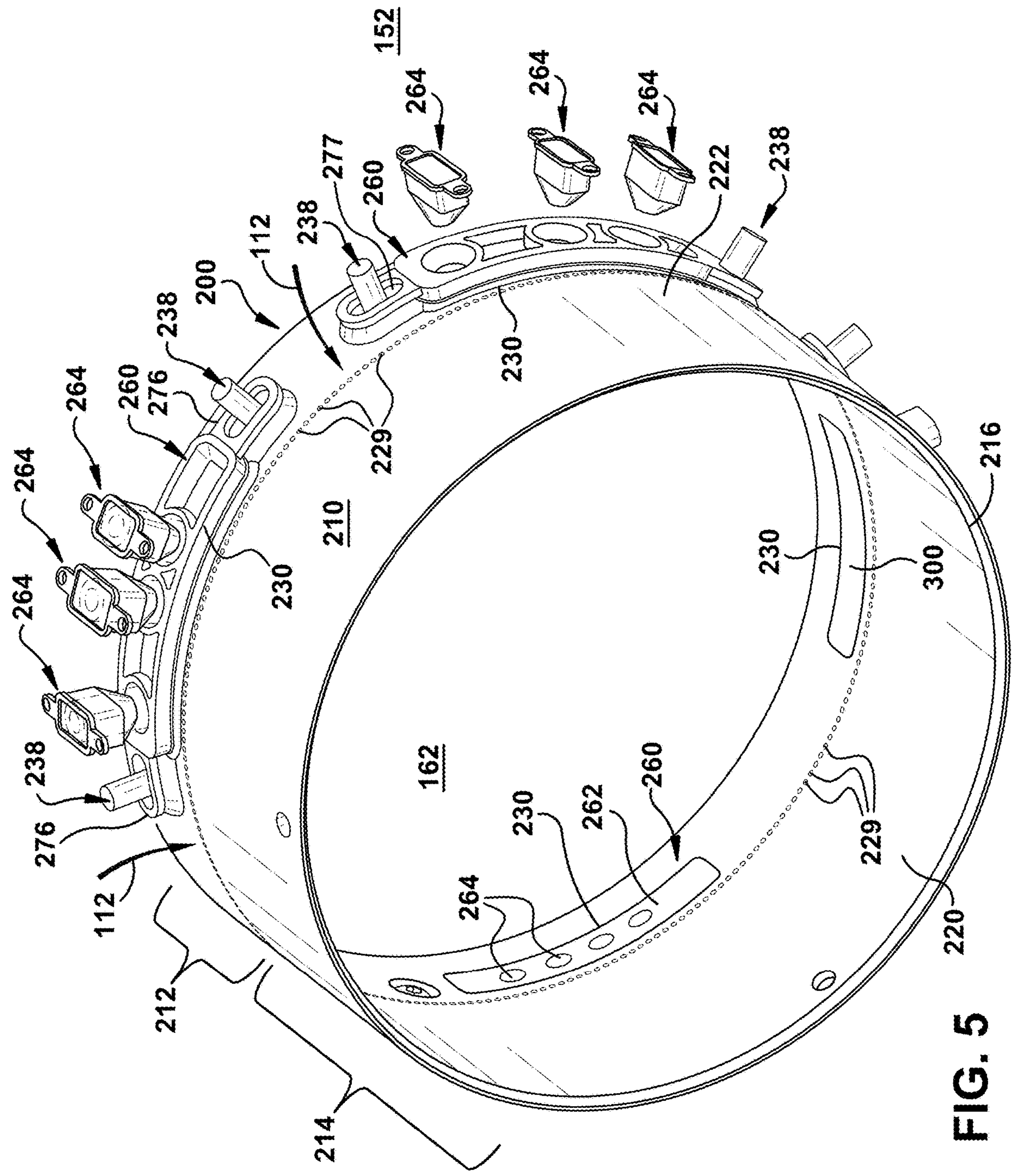
FIG. 5 shows a perspective view of a resonator system apart from a combustor, according to embodiments of the disclosure.

FIG. 3 shows a perspective view of combustor liner 160 and parts of resonator system 200 (with the fuel nozzle assembly removed); FIG. 4 shows a perspective view of resonator system 200 and parts of fuel nozzle assembly 170 (with the combustor liner removed); FIG. 5 shows a perspective view of resonator system 200 apart from combustor 100 (FIG. 2); and FIG. 6 shows a perspective view of a cylindrical member 210 of resonator system 200 apart from combustor 100 (FIG. 1).

As shown in FIG. 2, resonator system 200 for combustor 100 of GT system 90 (FIG. 1) is positioned, at least partially, between aft end 202 of fuel nozzle assembly 170 and forward end 204 of combustor liner 160 of combustor 100. More particularly, as shown in FIGS. 3-6, resonator system 200 includes a cylindrical member 210 including an aft portion 212 and a forward portion 214 contiguous with aft portion 212. Cylindrical member 210 also has a (cylindrical) wall 216 having a radially inner surface 220 and a radially outer surface 222. As noted, aft portion 212 of cylindrical member 210 is configured to be positioned between aft end 202 of fuel nozzle assembly 170 and forward end 204 of combustor liner 160 of combustor 100 (FIG. 2). Forward portion 214 of cylindrical member 210, which is contiguous with aft portion 212 is, in certain embodiments, configured to be positioned around part of fuel nozzle assembly 170. More particularly, as shown in FIG. 2, forward portion 214 of cylindrical member 210 may surround cap assembly 166, including premixing tubes 168. Forward portion 214 may extend any length over cap assembly 166 to ensure structural integrity and positioning of resonator system 200. In other embodiments, forward portion 214 of cylindrical member 210 may simply couple to aft end 202 of fuel assembly 170, e.g., aft plate of cap assembly 166. In any event, forward portion 214 may be coupled to any portion of cap assembly 166, fuel nozzle assembly 170 and/or surrounding structure to ensure structural integrity and positioning of resonator system 200 using any now known or later developed fixing structure such as but not limited to fasteners and/or welds.

Cylindrical member 210 is either fixedly coupled to combustor liner 160 or additively manufactured with combustor liner 160. As shown in FIGS. 2 and 3, in certain embodiments, aft portion 212 of cylindrical member 210 may be fixedly coupled to combustor liner 160. In this arrangement, aft portion 212 may be coupled to combustor liner 160 in any manner to ensure structural integrity and positioning of resonator system 200 using any now known or later developed fixing structure 215 (FIG. 3) such as but not limited to fasteners and/or welds. In other embodiments, combustor liner 160 may be additively manufactured as a unibody. More particularly, as shown in FIG. 3, combustor liner 160 may be additively manufactured with a cylindrical portion 224 and a tapered portion 226 thereof made as a one-piece unitary structure. Where combustor liner 160 is additively manufactured, cylindrical member 210 may also be additively manufactured therewith. In this case, cylindrical member 210 may be configured as an additional forward-extending length of combustor liner 160 (compared to where it would normally end), and cylindrical member 210 would include other structural differences from combustor liner 160, as will be described herein, to implement resonator system 200.

Figure 6:
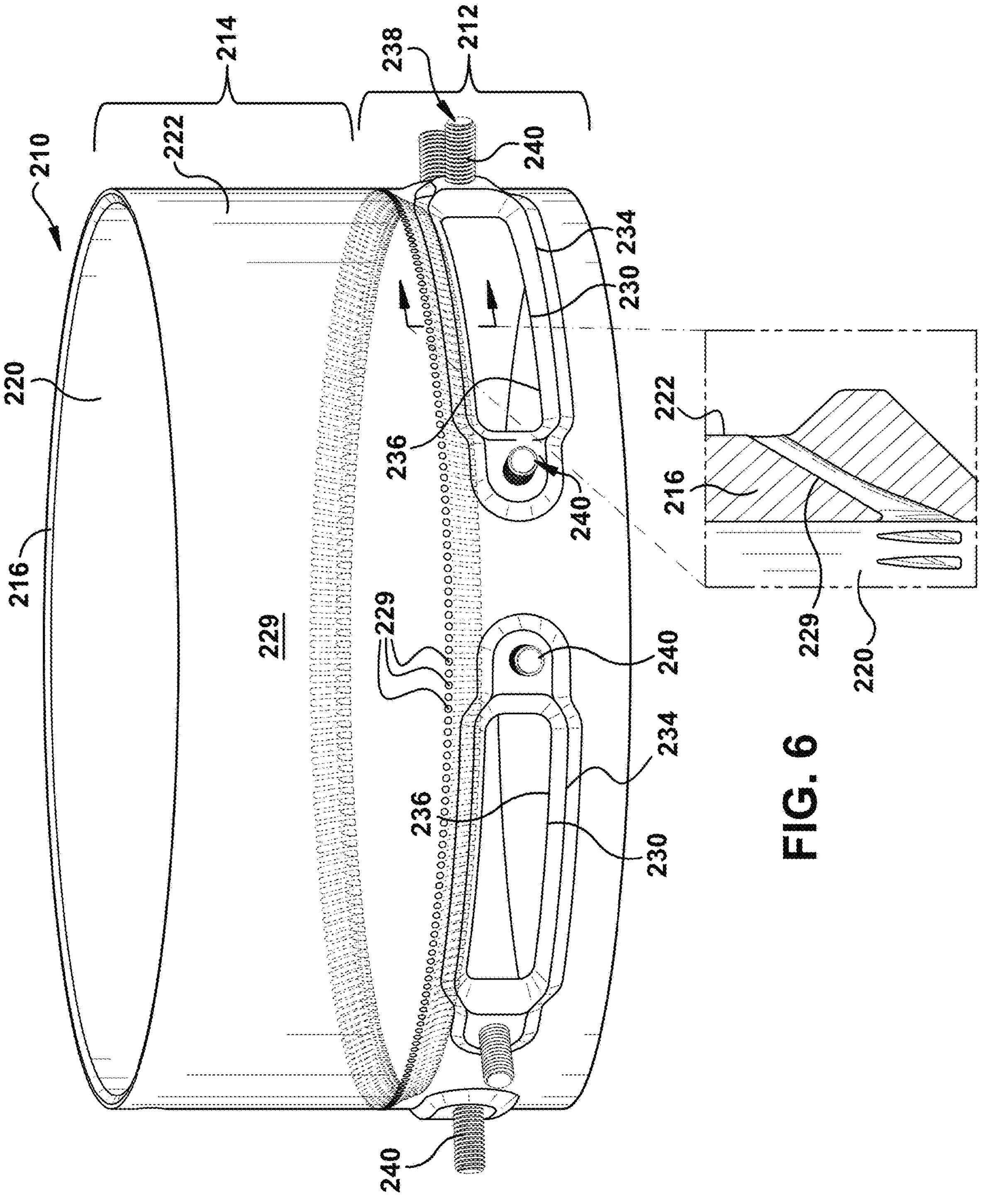
FIG. 6 shows a perspective view of a cylindrical member of a resonator system apart from a combustor, according to embodiments of the disclosure.

In certain embodiments, as shown in FIGS. 4-6, cylindrical member 210 may also include a plurality of circumferentially spaced cooling passages 229 extending through wall 216 thereof and fluidly coupling a source of compressed air, e.g., high pressure plenum 152, outside combustor liner 160 with combustion chamber 162 within combustor liner 160. Compressed air 112 from high pressure plenum 152 may flow through cooling passages 229 and cool, among other things, cylindrical member 210. Compressed air 112 eventually passes into combustion chamber 162 within combustor liner 160. Any number and arrangement of cooling passages 229 may be used.

Figure 7:
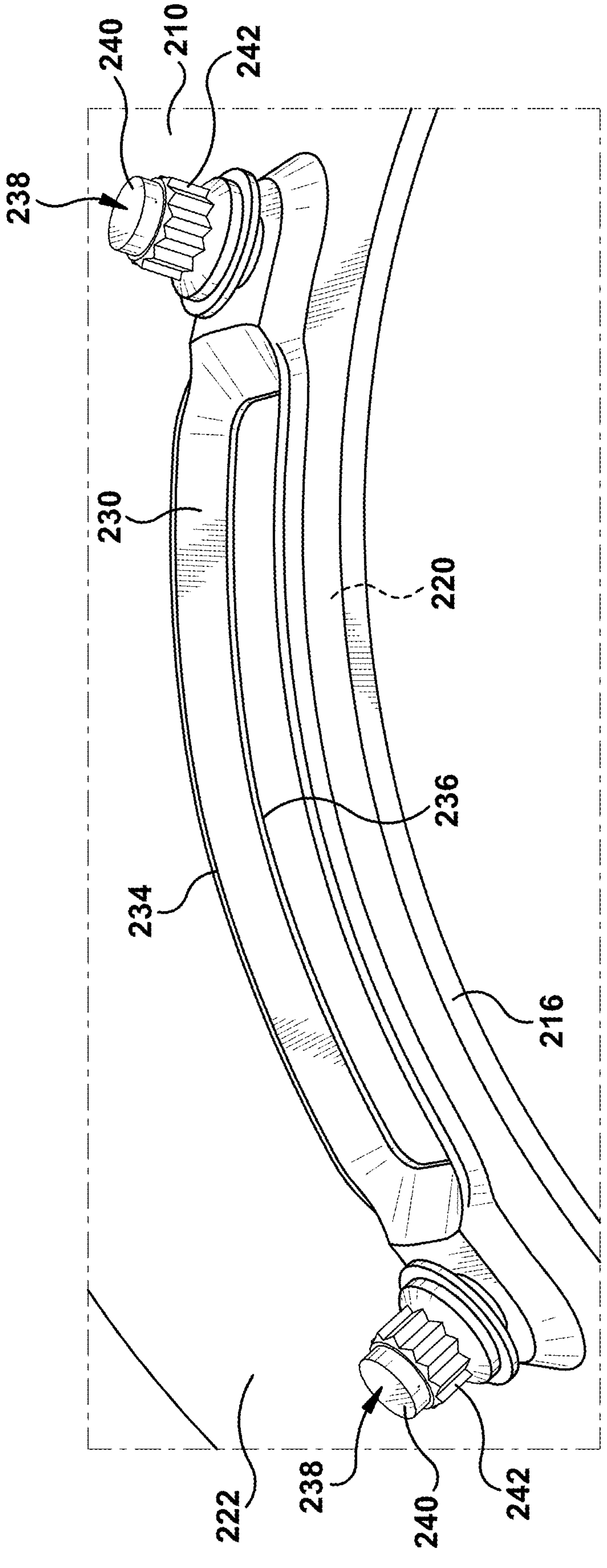
FIG. 7 shows an enlarged perspective view of an opening in a cylindrical member of a resonator system, according to embodiments of the disclosure.

FIG. 7 shows an enlarged perspective view of an opening 230 in cylindrical member 210. As shown in FIGS. 3-7, resonator system 200 may also include a plurality of openings 230 defined radially through wall 216 of cylindrical member 210, which are adjacent fuel nozzle assembly 170 in an operative state, and which extend circumferentially around a portion of cylindrical member 210. As will be described further herein, plurality of openings 230 (hereafter "openings 230" for brevity) are configured to mount a resonator mount 260 (FIGS. 4, 5, 8, 9) therein that mounts Helmholtz resonator(s) 264 (FIGS. 4, 5, 8-10) in an operative state relative to combustor liner 160 according to embodiments of the disclosure. In the example shown, four openings 230 are circumferentially spaced around cylindrical member 210 to mount four resonator mounts 260.

However, any number of openings 230 and resonator mounts 260 can be used. As shown in FIG. 2, when cylindrical member 210 is in an operative position within combustor 100, openings 230 of cylindrical member 210 are adjacent fuel nozzle assembly 170 so Helmholtz resonators 264 (see e.g., FIGS. 8-9) mounted thereby can address vibrations at various locations of combustor 100 (FIG. 2). Forward portion 214 of cylindrical member 210 may be sized lengthwise and/or diametrically to position openings 230 adjacent fuel nozzle assembly 170 in any manner, e.g., axially relative to combustion chamber 162, where a user wants to address vibrations.

As will be described further herein, openings 230 have a cross-sectional shape to receive resonator mount 260 (to mount Helmholtz resonators 264) in an operative state relative to combustor liner 160 according to embodiments of the disclosure. Although not necessary in all cases, as shown in FIGS. 6 and 7, in certain embodiments, openings 230 may have a radially outer cross-sectional area 234 that is larger than a radial inner cross-sectional area 236 thereof so opening 230 has a slanted sidewall that allows a correspondingly configured resonator mount 260 to seat therein and not pass into combustor liner 160. In other embodiments, openings 230 may have radially extending sidewalls or other configurations of sidewalls. Openings 230 may extend a predefined circumferential extent within cylindrical member 210 to accommodate a similarly sized resonator mount 260 having any desired number of Helmholtz resonators 264 therein. In the non-limiting example shown, each of the four openings 230 extends between 30-45° in circumferential extent. Other circumferential extents for openings 230 may be used where resonator mounts 260 with more or less Helmholtz resonators 264 are desired. It is not required that openings 230 have the same circumferential extent. Openings 230 may be machined into cylindrical member 210 in any known fashion, or they may be additively manufactured therewith.

Figure 8:
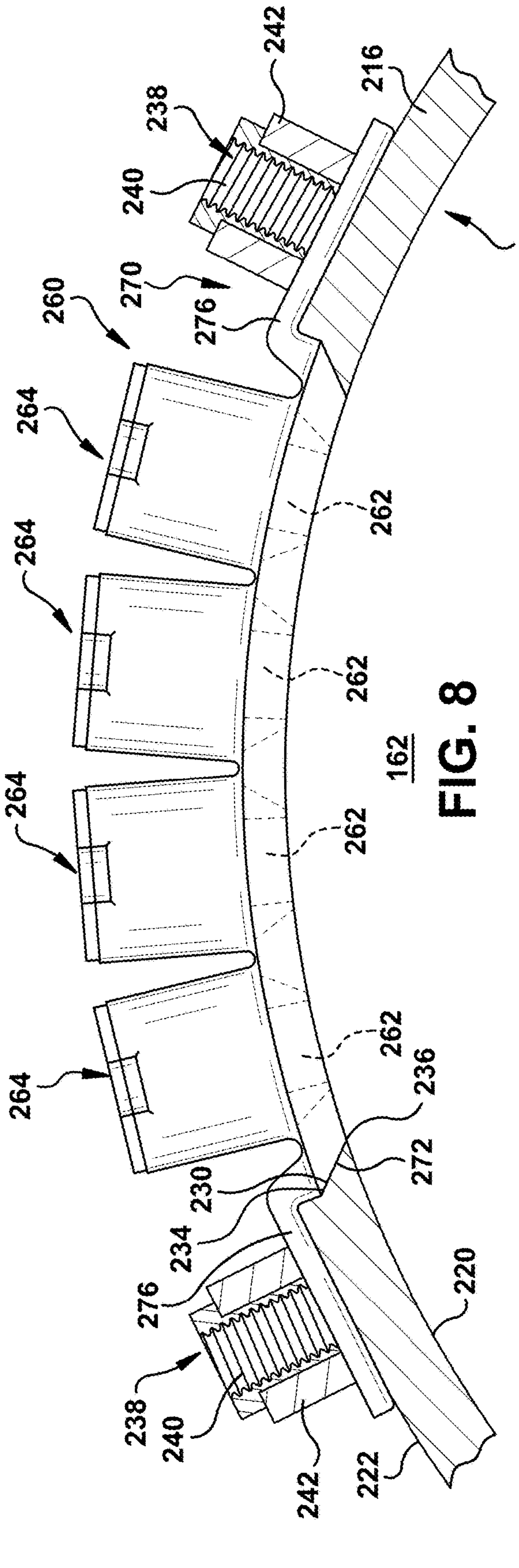
FIG. 8 shows a side view of a resonator mount of a resonator system, according to embodiments of the disclosure.
Figure 9:
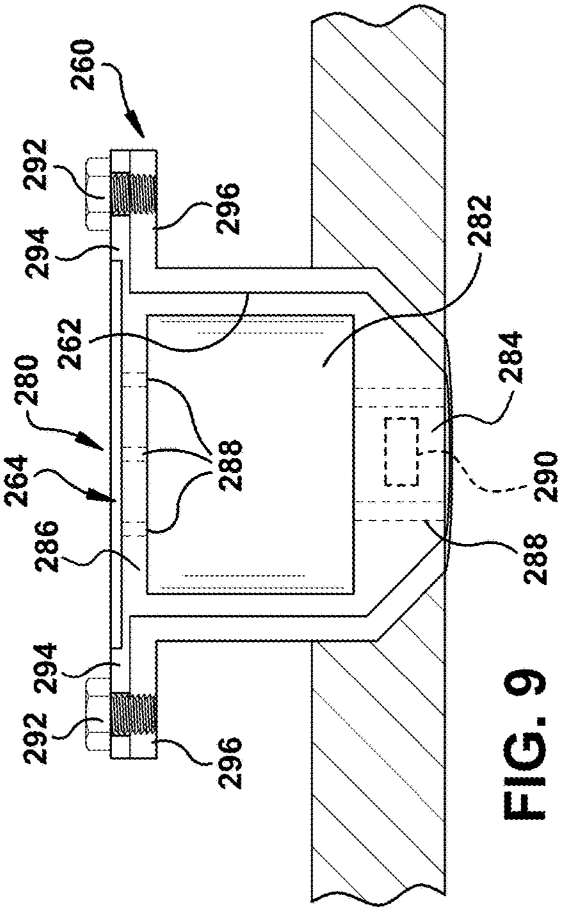
FIG. 9 shows a cross-sectional view of a resonator in a resonator port in a resonator mount with a Helmholtz resonator therein, according to various embodiments of the disclosure.

FIG. 8 shows a side view of a resonator mount 260, and FIG. 9 shows a cross-sectional view of a resonator receptacle 262 in resonator mount 260 with a Helmholtz resonator 264 therein, according to various embodiments of the disclosure. Resonator system 200 also includes a resonator mount 260 configured to be removably coupled in at least one of openings 230 defined in cylindrical member 210. Resonator mount(s) 260 include at least one resonator receptacle 262 in fluid communication with combustion chamber 162 in combustor liner 160 in an operative state. As will be further described, resonator system 200 also includes a Helmholtz resonator 264 configured to be removably coupled in a respective resonator receptacle 262 of resonator mount 260 and in fluid communication with combustion chamber 162 in combustor liner 160.

As shown in FIG. 8, resonator mount 260 includes a body 270 having a mount surface 272 configured to mate with sidewall(s) of opening 230 regardless of the opening's form.

More particularly, in certain embodiments, each of opening 230 and each resonator mount 260 have mating radially inner and outer cross-sectional areas (234, 236 of openings 230). In FIG. 8, mount surface 272 includes a slanted outer wall configured to mate with corresponding slanted sidewall(s) of opening 230. In this example case, as previously described relative to openings 230, radially outer cross-sectional area 234 of each opening 230 and each resonator mount 260 is larger than a radial inner cross-sectional area 236 of each opening 230 and each resonator mount 260. In this manner, resonator mount 260 seats in a respective opening 230 and cannot pass into combustion chamber 162 within combustor liner 160 (FIG. 2). In certain embodiments, shown for example in FIG. 9, a radially inner surface 274 of resonator mount 260 is flush with radially inner surface 220 of cylindrical member 210. That is, radially inner surface 274 of resonator mount 260 and radially inner surface 220 of cylindrical member 210 have substantially similar radii of curvature, and radially inner surface 274 does not project radially inward of radially inner surface 220 when resonator mount 260 is positioned in a respective opening 230.

Figure 10:
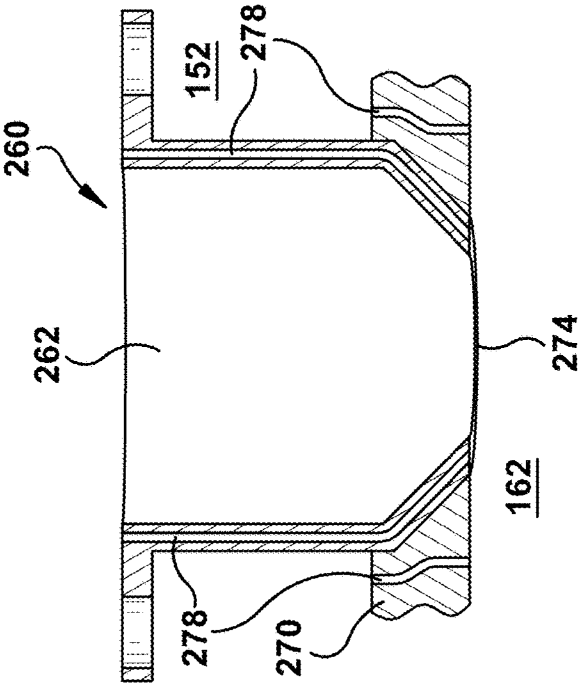
FIG. 10 shows a cross-sectional view of a resonator that is part of a resonator system, according to optional embodiments of the disclosure.

FIG. 10 shows a cross-sectional view of resonator mount 260 according to an optional embodiment. In certain embodiments, resonator mount 260 includes a plurality of cooling passages 278 therein fluidly coupling a source of compressed air, e.g., high pressure plenum 152, outside combustor liner 160 (FIG. 2) with combustion chamber 162 within combustor liner 160 (FIG. 2). Compressed air 112 from high pressure plenum 152 can enter cooling passages 278 (e.g., through corresponding holes, not shown, in resonator flange 294) and flow through any desired parts of resonator mount 260, e.g., resonator receptacle(s) 262, in any now known or later developed manner to cool body 270 of resonator mount 260 and/or, if desired, resonator receptacle(s) 262 thereof. While particular examples of cooling passages 278 are shown, it is understood that they can take a wide variety of paths through resonator mount 260. Any number of cooling passages 278 having any desired path and/or cross-sectional shape and/or size can be used. Cooling passages 278 can be machined into resonator mount 260 or can be additively manufactured therewith, e.g., as microchannels.

Resonator mount(s) 260 may be removably coupled in respective opening(s) 230. Cylindrical member 210 may include a fastening system 238 (FIG. 8) for removably coupling a resonator mount 260 to a respective opening 230. Resonator mount 260 may include one or more fastener engagement elements 276 for operational engagement with fastening system 238. While a wide variety of fastening systems 238 are possible and within the scope of the disclosure, in certain embodiments shown, fastening system 238 includes a threaded post 240 extending radially outward from cylindrical member 210 adjacent opening(s) 230 for coupling of resonator mount 260. Resonator mount 260 may have any now known or later developed fastener engagement features 276 to engage threaded post 240. In one non-limiting example shown, fastener engagement features 276 may include an opening or slot 277 (FIGS. 5, 13) in body 270 capable of receiving threaded post 240 therethrough. A threaded fastener 242 may be threaded onto threaded post 240 to couple resonator mount 260 to opening 230. While two fastening systems 238 are shown for each opening 230, one or more than two may be used. Other fastening systems 238 may include but are not limited to: posts with a cotter pin, twist-locking mechanisms, or snap couplers on a ridged or threaded post. Fastening system 238 allows removable coupling of resonator mounts 260 so that different resonator mounts 260 can be used within a given opening 230, perhaps with different Helmholtz resonators 264 therein to customize the frequency damped thereby.

Figure 11:
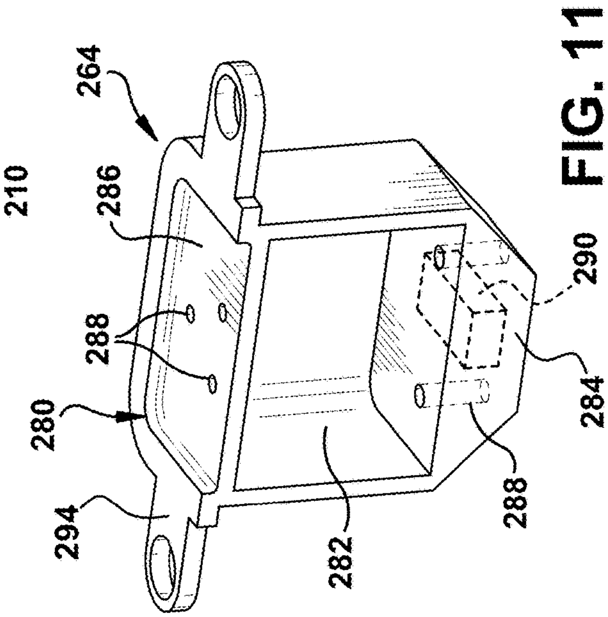
FIG. 11 shows a partial cross-sectional perspective view of a Helmholtz resonator of a resonator system, according to embodiments of the disclosure.

FIG. 11 shows a partial cross-sectional perspective view of a Helmholtz resonator 264, according to various embodiments of the disclosure. With reference to FIGS. 9 and 11, each Helmholtz resonator 264 defines a damping volume 282 configured to dampen a preselected frequency. More particularly, Helmholtz resonator 264 includes a body 280 defining damping volume 282 between a first perforated member 284 in fluid communication with combustion chamber 162 and a second perforated member 286 in fluid communication with a space, i.e., high pressure plenum 152, outside of combustor liner 160. Perforated members 284, 286 may include any structure that allows air flow therethrough in a restrained manner as dictated by a plurality of openings 288 therethrough. Openings 288 may have any desired number and/or cross-sectional size to provide the desired Helmholtz resonance. Perforated members 284, 286 may also have any thickness to obtain the desired damping frequency.

Damping volume 282 is defined within body 280 between perforated members 284, 286 and between sidewalls of body 280, i.e., in the latter case, by the space between sidewalls on left and right and into and out of page of FIGS. 9 and 11. Damping volume 282 may be selected to dampen a particular frequency or, perhaps, a range of frequencies. Sets of Helmholtz resonators 264 having different damping volumes 282 and capable of addressing different frequencies yet capable of mounting in the same resonator receptacle 262 may be provided. Where desired, a damping weight 290 (dashed box) may also be positioned in or on perforated member 284 to further adjust a resonant frequency of Helmholtz resonator 264 and hence the frequency it can dampen in combustor 100. Damping weight 290 is optional. Body 280 can also have any variety of structural configurations to provide a desired damping volume and damping frequency.

Resonator receptacle(s) 262 and Helmholtz resonators 264 are configured so each Helmholtz resonator 264 mates within a respective resonator receptacle 262. Body 280 of Helmholtz resonator 264 can have any shape to mate within a respective resonator receptacle 262 within a respective resonator mount 260 and provide the desired damping volume 282 for damping a desired frequency. In certain embodiments, as shown in FIG. 9, Helmholtz resonators 264 and resonator receptacle 262 telescopically slidingly mate with one another. That is, each Helmholtz resonator 264 is telescopically slidable into one or more resonator receptacles 262 of resonator mount 260. In certain embodiments, as shown in FIGS. 8 and 9, resonator receptacle(s) 262 and Helmholtz resonator(s) 264 have mating (generally) rectangular inner and outer cross-sectional shapes. In the examples shown, the rectangular inner and outer cross-sectional shapes have a length thereof extending in a circumferential direction (side-to-side in FIGS. 8 and 9) of cylindrical member 210. However, this layout is not necessary in all cases. Furthermore, resonator receptacle(s) 262 and Helmholtz resonator(s) 264 can have any variety of mating inner and outer cross-sectional shapes. In another example shown in FIG. 4, resonator receptacle(s) 262 and Helmholtz resonator(s) 264 have mating circular or oval inner and outer cross-sectional shapes. While telescopic slidingly mating arrangements of resonators 264 and receptacles 262 have been illustrated, other arrangements of operationally coupling Helmholtz resonators 264 to resonator receptacles 262 may be possible such as but not limited to sealingly fastening the resonator(s) to receptacle(s) without a telescopic interaction, e.g., using breakable welds or fasteners.

As shown in FIGS. 4, 5 and 8, a plurality of resonator receptacles 262 may be provided in each resonator mount 260 with each resonator receptacle 262 including a respective Helmholtz resonator 264 removably coupled therein. While four resonator receptacles 262 have been shown in each resonator mount 260 in the drawings, it is emphasized that any number of receptacles 262 and corresponding Helmholtz resonators 264 can be used within a given resonator mount 260, e.g., one, two, three, or more than four. Resonator receptacles 262 may be longitudinally spaced on resonator mount 260, i.e., to be spaced circumferentially around cylindrical member 210. However, depending on their axial extents (e.g., into and out of page of FIG. 8), other arrangements, like placing them axially side-by-side, may be possible.

As will be further described, at least two of the Helmholtz resonators 264 on a given resonator mount 260 (or between different resonator mounts 260) may have different damping volumes 282 (FIGS. 9, 11) to dampen different frequencies. Helmholtz resonator 264 is removably coupled to resonator mount 260 so Helmholtz resonators 264 addressing different frequencies can be changed out of a given resonator mount 260. Helmholtz resonators 264 may be removably coupled to respective mount 260 using any now known or later developed selectively usable fastening mechanism such as but not limited breakable welds and/or threaded fasteners. In certain embodiments, shown in FIG. 9, Helmholtz resonators 264 may be removably coupled to respective mount 260 using a threaded fastener 292 coupling a flange 294 on body 280 of Helmholtz resonator 264 and a flange 296 of resonator receptacle 262. Other removable coupling systems are also possible and considered within the scope of the disclosure.

Resonator system 200 is highly customizable to provide damping of any variety of frequencies using different Helmholtz resonators 264 with different damping volumes 282 where needed. For example, resonator receptacles 262 may be sized to receive correspondingly sized Helmholtz resonators 264 that may or may not have the same damping volume 282 therein. For example, FIG. 4 shows resonator mounts 260 at roughly twelve and nine o'clock positions (e.g., top and right positions, respectively) that include resonator receptacles 262 having different sizes, e.g., with different radial, axial or circumferential extents. For example, at the nine o'clock position, resonator receptacles 262A are different sizes than resonator receptacle 262B, which is observed mainly by their different radial extents from body 270 of resonator mount 260. In another example, at the twelve o'clock position, resonator receptacles 262C are different sizes than resonator receptacle 262D and resonator receptacle 262E, which is observed mainly by their different radial extents from body 270 of resonator mount 260. Other resonator mounts 260 on the same cylindrical member 210 may have similarly sized or differently sized resonator receptacles 262 to allow use of different sized Helmholtz resonators 264 configured to address different frequencies. Helmholtz resonators 264 in the different resonator receptacles 262 may also have different damping volumes 282 to address different frequencies.

In addition, even though resonator receptacles 262 share a common size, a damping volume 282 within Helmholtz resonators 264 therein may be different to address different frequencies. The result is that resonator system 200 is highly customizable to selectively position the correct Helmholtz resonators 264 where needed. Resonator system 200 can also address situations where vibrations (e.g., acoustic oscillations) change over time by allowing Helmholtz resonators 264 to be replaced at any time. Resonator system 200 is also highly flexible because it can be applied to different designs of combustor 100 now known or later developed.

Figure 12:
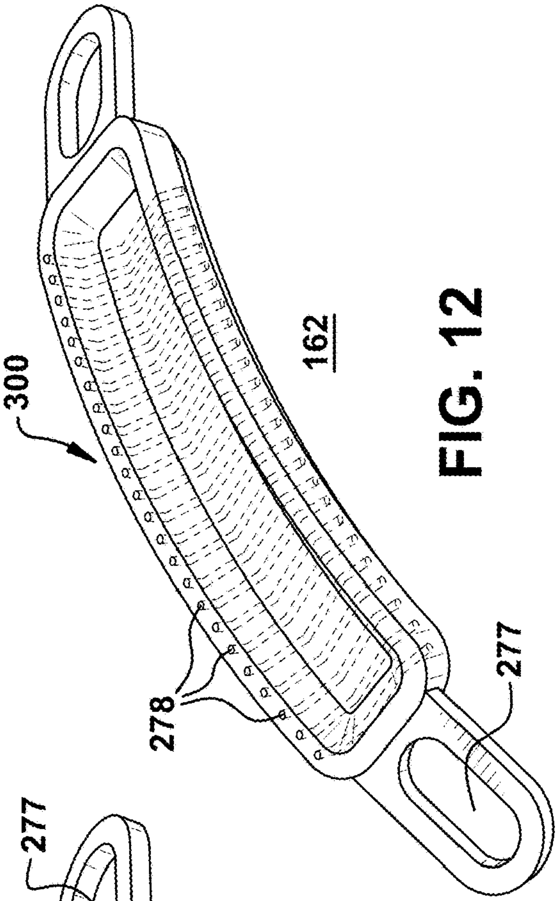
FIG. 12 shows a perspective view of a cover plate of a resonator system, according to embodiments of the disclosure.

In certain embodiments, the number of resonator mounts 260 used in a given cylindrical member 210 may also be user selected. In some embodiments, each of the plurality of openings 230 in cylindrical member 210 includes a respective resonator mount 260 therein having Helmholtz resonator(s) 264 in the at least one resonator receptacle 262 thereof. FIG. 4 shows an embodiment including resonator mount 260 in each opening 230. In other embodiments, for locations where vibration damping is not warranted, a resonator mount 260 may be omitted in selected opening(s) 230 in cylindrical member 210. To address this situation, as shown in FIG. 5 and the perspective view of FIG. 12, resonator system 200 may also include a cover plate 300 removably coupled in at least one of openings 230 to close the opening 230 in wall 216 of cylindrical member 210. As shown in FIG. 12, cover plate 300 is devoid of resonator receptacles 262 and may be a solid member excepting perhaps cooling passages 278 therein for cooling the cover plate 300, similarly to cooling passages 278 (FIG. 10) described relative to resonator mount 260. Cover plate 300 may have a similar mating surface(s) as resonator mount 260 to sealingly close opening 230. Cover plate 300 may be removably coupled to cylindrical member 210 in a similar fashion as described herein relative to resonator mounts 260 using similar mounting structure (e.g., fastener engagement elements 276, openings 277). Advantageously, where vibrations later develop where a cover plate 300 is used, the cover plate 300 can be replaced by a resonator mount 260 with customized Helmholtz resonators 264 to address the vibrations. Similarly, where vibrations later dissipate or disappear where a resonator mount 260 is used, the resonator mount 260 can be replaced by a cover plate 300.

Figure 13:
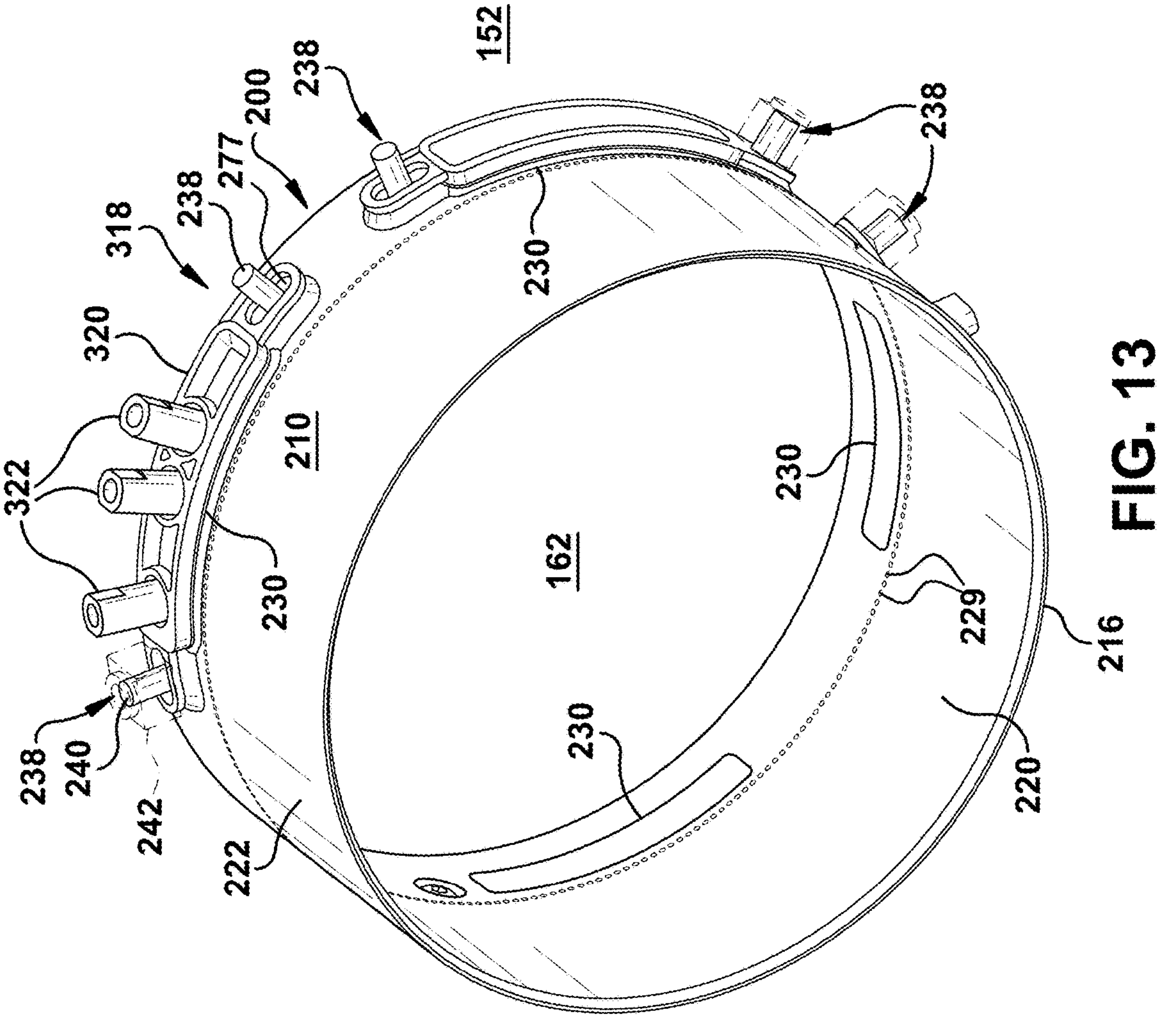
FIG. 13 shows a perspective view of an acoustic probe tester of a resonator system, according to embodiments of the disclosure.
Figure 14:
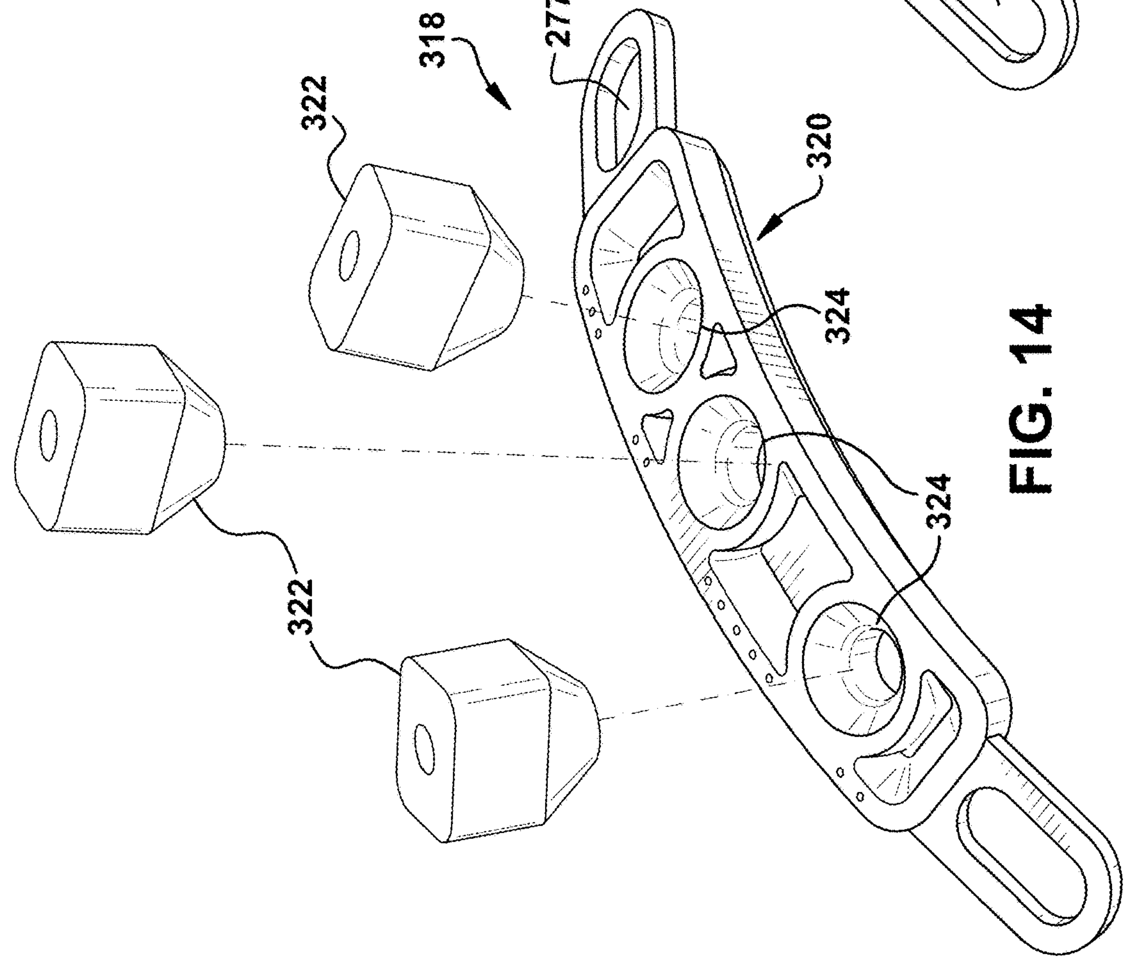
FIG. 14 shows a perspective view of a resonator test mount with acoustic probe ports and acoustic probes of a resonator system, according to embodiments of the disclosure.

Identifying the required damping frequency at a particular location within combustor 100 and, more particularly, around cylindrical member 210 may be needed where the tones at the particular location are unknown. Referring to FIGS. 13-14, in order to address this situation, resonator system 200 may also include an acoustic probe tester 318 including a resonator test mount 320 configured to be positioned in at least one of plurality of openings 230 defined in wall 216 of cylindrical member 210. FIG. 13 shows a perspective view of resonator system 200 including resonator test mount 320 apart from combustor 100 (FIG. 2); and FIG. 14 shows a perspective view of resonator test mount 320 with acoustic probe ports 324 and acoustic probes 322, according to various embodiments of the disclosure. Rather than mounting Helmholtz resonators 264 (FIG. 8), resonator test mount 320 is configured to mount acoustic probes 322 to test for vibrations requiring damping at a given location. To this end, resonator test mount 320 includes at least one acoustic probe port 324 in fluid communication with combustion chamber 162 in combustor liner 160 (FIG. 2). Acoustic probe(s) 322 are configured to be removably coupled in at least one acoustic probe port 324 of resonator test mount 320 and are configured to identify the preselected frequency to be dampened at a location of the at least one acoustic probe port 324 in which acoustic probe 322 is removably coupled.

Acoustic probes 322 can take any now known or later developed form capable of identifying vibration frequencies at a given location in cylindrical member 210, e.g., during operation or simulated operation of combustor 100. Acoustic probes 322 can be operatively coupled to any form of processor (not shown) in a known fashion. A resonator test mount 320 with related acoustic probes 322 can be positioned in each opening 230 during testing, or only certain openings 230 may include a resonator test mount 320. Where locations of certain openings 230 are not being tested, resonator system 200 may include cover plate(s) 300 (FIG. 12) configured to be positioned in opening(s) 230 to close the opening(s) 230 in wall 216 of cylindrical member 210. It will be recognized that the vibration testing may include any now known or later developed testing techniques. Since the vibration testing is known to those with skill in the art, no further details are provided so the reader can focus on the salient portions of the disclosure.

Embodiments of the disclosure also include fuel nozzle assembly 170 (FIG. 2) including resonator system 200 as described herein. As described herein, cap assembly 166 includes premixing tubes 168, which are incorporated in one or more fuel nozzles positioned adjacent resonator system 200.

Embodiments of the disclosure also include combustor 100 (FIGS. 1-2) including resonator system 200, as described herein.

Figure 15:
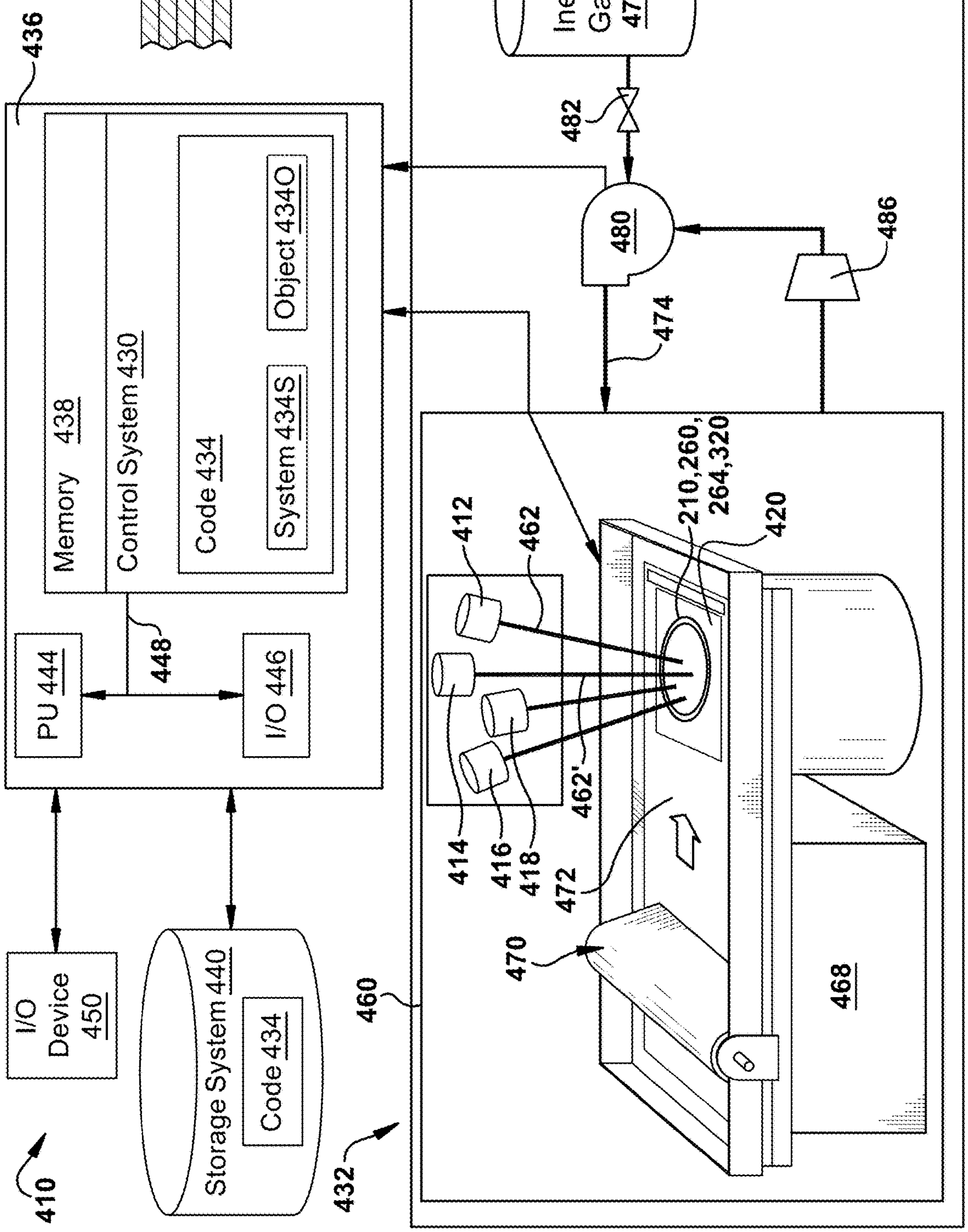
FIG. 15 shows a schematic block view of an illustrative computerized metal powder additive manufacturing system for generating part(s) of a resonator system, according to embodiments of the disclosure.

One or more parts of resonator system 200 described herein may be additively manufactured. For example, cylindrical member 210 may be additively manufactured with combustor liner 160 or as a separate part, and/or Helmholtz resonators 264 and/or resonator mounts 260 and/or cover plates 300 may be additively manufactured. FIG. 15 shows a schematic/block view of an illustrative computerized metal powder additive manufacturing system 410 (hereinafter 'AM system 410') for generating part(s) of resonator system 200, of which only a single layer is shown. The teachings of the disclosures will be described relative to building part(s) of resonator system 200 using multiple melting beam sources 412, 414, 416, 418, but it is emphasized and will be readily recognized that the teachings of the disclosure are equally applicable to build part(s) of resonator system 200 using any number of melting beam sources. In this example, AM system 410 is arranged for direct metal laser melting (DMLM). It is understood that the general teachings of the disclosure are equally applicable to other forms of metal powder additive manufacturing such as but not limited to selective laser melting (SLM) or direct metal laser sintering (DMLS), and perhaps other forms of additive manufacturing (i.e., other than metal powder applications). The layer of part(s) of resonator system 200 in build platform 420 is illustrated as a circular element in FIG. 15; however, it is understood that the additive manufacturing process can be readily adapted to manufacture any shape on build platform 420, e.g., that of any part of resonator system 200.

AM system 410 generally includes an additive manufacturing control system 430 ("control system") and an AM printer 432. As will be described, control system 430 executes a set of computer-executable instructions or code 434 to generate part(s) of resonator system 200 using multiple melting beam sources 412, 414, 416, 418. In the example shown, four melting beam sources may include four lasers. However, the teachings of the disclosure are applicable to any melting beam source, e.g., an electron beam, laser, etc. Control system 430 is shown implemented on computer 436 as computer program code. To this extent, computer 436 is shown including a memory 438 and/or storage system 440, a processor unit (PU) 444, an input/output (I/O) interface 446, and a bus 448. Further, computer 436 is shown in communication with an external I/O device/resource 450. In general, processor unit (PU) 444 executes computer program code 434 that is stored in memory 438 and/or storage system 440. While executing computer program code 434, processor unit (PU) 444 can read and/or write data to/from memory 438, storage system 440, I/O device 450 and/or AM printer 432. Bus 448 provides a communication link between each of the components in computer 436, and I/O device 450 can comprise any device that enables a user to interact with computer 436 (e.g., keyboard, pointing device, display, etc.).

Computer 436 is only representative of various possible combinations of hardware and software. For example, processor unit (PU) 444 may comprise a single processing unit or be distributed across one or more processing units in one or more locations, e.g., on a client and server. Similarly, memory 438 and/or storage system 440 may reside at one or more physical locations. Memory 438 and/or storage system 440 can comprise any combination of various types of non-transitory computer readable storage medium including magnetic media, optical media, random access memory (RAM), read only memory (ROM), etc. Computer 436 can comprise any type of computing device such as an industrial controller, a network server, a desktop computer, a laptop, a handheld device, etc.

As noted, AM system 410 and, in particular control system 430, executes code 434 to generate part(s) of resonator system 200. Code 434 can include, among other things, a set of computer-executable instructions 434S (herein also referred to as 'code 434S') for operating a system (i.e., AM printer 432) and a set of computer-executable instructions 434O (herein also referred to as 'code 434O') for defining an object (i.e., part(s) of resonator system 200) to be physically generated by AM printer 432. As described herein, additive manufacturing processes begin with a non-transitory computer readable storage medium (e.g., memory 438, storage system 440, etc.) storing code 434. Set of computer-executable instructions 434S for operating AM printer 432 may include any now known or later developed software code capable of operating AM printer 432.

The set of computer-executable instructions 434O defining part(s) of resonator system 200 may include a precisely defined 3D model of part(s) of resonator system 200 and can be generated from any of a large variety of well-known computer aided design (CAD) software systems such as AutoCAD®, TurboCAD®, DesignCAD 3D Max, etc. In this regard, code 434O can include any now known or later developed file format. Furthermore, code 434O representative of the part to be built, e.g., part(s) of resonator system 200, may be translated between different formats. For example, code 434O may include files in Standard Tessellation Language (STL), which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer.

Code 434O representative of part(s) of resonator system 200 may also be converted into a set of data signals and transmitted, received as a set of data signals and converted to code, stored, etc., as necessary. Code 434O may be configured according to embodiments of the disclosure to allow for formation of border and internal sections in overlapping field regions, as will be described. In any event, code 434O may be an input to AM system 410 and may come from a part designer, an intellectual property (IP) provider, a design company, the operator or owner of AM system 410, or from other sources. In any event, control system 430 executes code 434S and 434O, dividing part(s) of resonator system 200 into a series of thin slices that assembles using AM printer 432 in successive layers of material.

AM printer 432 may include a processing chamber 460 that is sealed to provide a controlled atmosphere for part(s) of resonator system 200 printing. A build platform 420, upon which part(s) of resonator system 200 is/are built, is positioned within processing chamber 460. A number of melting beam sources 412, 414, 416, 418 are configured to melt layers of metal powder on build platform 420 to generate part(s) of resonator system 200. While four melting beam sources 412, 414, 416, 418 are illustrated, it is emphasized that the teachings of the disclosure are applicable to a system employing any number of sources, e.g., 1, 2, 3, or 5 or more. As understood in the field, each melting beam source 412, 414, 416, 418 may have a field including a non-overlapping field region, respectively, in which it can exclusively melt metal powder, and may include at least one overlapping field region in which two or more sources can melt metal powder. In this regard, each melting beam source 412, 414, 416, 418 may generate a melting beam, respectively, that fuses particles for each slice, as defined by code 434O.

For example, in FIG. 15, melting beam source 412 is shown creating a layer of part(s) of resonator system 200 using melting beam 462 in one region, while melting beam source 414 is shown creating a layer of part(s) of resonator system 200 using melting beam 462' in another region. Each melting beam source 412, 414, 416, 418 is calibrated in any now known or later developed manner. That is, each melting beam source 412, 414, 416, 418 has had its laser or electron beam's anticipated position relative to build platform 420 correlated with its actual position in order to provide an individual position correction (not shown) to ensure its individual accuracy. In one embodiment, each of plurality melting beam sources 412, 414, 416, 418 may create melting beams, e.g., 462, 462', having the same cross-sectional dimensions (e.g., shape and size in operation), power and scan speed.

Continuing with FIG. 15, an applicator (or re-coater blade) 470 may create a thin layer of raw material 472 spread out as the blank canvas from which each successive slice of the final part(s) of resonator system 200 will be created. Various parts of AM printer 432 may move to accommodate the addition of each new layer, e.g., a build platform 420 may lower and/or chamber 460 and/or applicator 470 may rise after each layer. The process may use different raw materials in the form of fine-grain metal powder, a stock of which may be held in a chamber 468 accessible by applicator 470.

Processing chamber 460 is filled with an inert gas such as argon or nitrogen and controlled to reduce or eliminate oxygen. Control system 430 is configured to control a flow of a gas mixture 474 within processing chamber 460 from a source of inert gas 476. In this case, control system 430 may control a pump 480, and/or a flow valve system 482 for inert gas to control the content of gas mixture 474. Flow valve system 482 may include one or more computer controllable valves, flow sensors, temperature sensors, pressure sensors, etc., capable of precisely controlling flow of the particular gas. Pump 480 may be provided with or without valve system 482. Where pump 480 is omitted, inert gas may simply enter a conduit or manifold prior to introduction to processing chamber 460. Source of inert gas 476 may take the form of any conventional source for the material contained therein, e.g., a tank, reservoir or other source. Any sensors (not shown) required to measure gas mixture 474 may be provided. Gas mixture 474 may be filtered using a filter 486 in a conventional manner.

In operation, build platform 420 with metal powder thereon is provided within processing chamber 460, and control system 430 controls flow of gas mixture 474 within processing chamber 460 from source of inert gas 476. Control system 430 also controls AM printer 432, and in particular, applicator 470 and melting beam sources 412, 414, 416, 418 to sequentially melt layers of metal powder on build platform 420 to generate the desired part according to embodiments of the disclosure. While a particular AM system 410 has been described herein, it is emphasized that the teachings of the disclosure are not limited to any particular additive manufacturing system or method.

Figure 16:
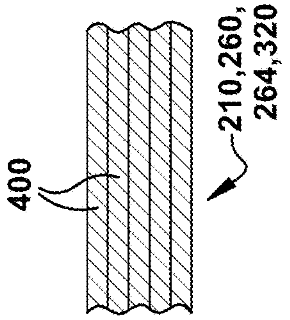
FIG. 16 shows a cross-sectional view of metallurgically bonded layers in part(s) of a resonator system, according to embodiments of the disclosure.

Once part(s) of resonator system 200 is/are formed, the parts may be installed with other parts of combustor 100 to form combustor 100. The installation may include any now known or later developed technique for installing the particular combustor components used. As noted, part(s) of resonator system 200 may be additively manufactured using any now known or later developed technique. Consequently, as shown in the cross-section of FIG. 16 of any part of part(s) of resonator system 200 (e.g., Helmholtz resonator 264, resonator mount 260, cylindrical member 210, cover plate 300, resonator test mount 320, etc.) includes a plurality of parallel metal layers 400 metallurgically bonded throughout an entire height thereof. Where, perhaps after operation or testing, a different or more precise damping volume 282 is desired at a particular location, the current Helmholtz resonator 264 at that location can be replaced with another Helmholtz resonator 264 with a different sized and/or shaped damping volume 282, which may be additively manufactured as described herein, to achieve the desired damping volume.

Embodiments of the disclosure provide various technical and commercial advantages, examples of which are discussed herein. For example, the Helmholtz resonators can be readily installed and replaced, and they can dampen different preselected frequencies, making the system highly customizable. In another example, if new dynamic tones begin to appear, for example, in the area on the combustor liner and around the fuel nozzles, the plug-and-play style of the Helmholtz resonators will allow those tones to be addressed without having to perform a major redesign. In another example, the resonator system also may include cover plates to fill the openings where no vibration damping is required, increasing the operability of the resonator system. The openings (and cooling passages in the cylindrical member and/or the resonator mount) allow placement of resonators where they previously were unable to be used. The resonator system includes an acoustic probe mount for positioning acoustic (testing) probes in the openings to identify frequencies to be damped at various locations in yet another exemplary advantage.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. “Approximately” or “about,” as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application of the technology and to enable others of ordinary skill in the art to understand the disclosure for contemplating various modifications to the present embodiments, which may be suited to the particular use contemplated.

What is claimed is:

1. A resonator system for a combustor of a gas turbine system, the resonator system comprising:
- a cylindrical member configured to be positioned between an aft end of a fuel nozzle assembly and a forward end of a combustor liner of the combustor;
- a plurality of openings defined radially through a wall of the cylindrical member adjacent the fuel nozzle assembly;
- a resonator mount configured to be removably coupled in at least one opening of the plurality of openings defined in the cylindrical member, the resonator mount including at least one resonator port in fluid communication with a combustion chamber in the combustor liner;
- a Helmholtz resonator removably coupled in the at least one resonator port of the resonator mount and in fluid communication with the combustion chamber in the combustor liner, the Helmholtz resonator configured to dampen a preselected frequency; and
- a cover plate configured to be positioned in at least one other opening of the plurality of openings to close the at least one other opening in the wall of the cylindrical member.

2. The resonator system of claim 1, wherein the Helmholtz resonator includes a body defining a damping volume between a first perforated member in fluid communication with the combustion chamber and a second perforated member in fluid communication with a space outside of the combustor liner, wherein the damping volume is configured to dampen the preselected frequency.

3. The resonator system of claim 1, wherein the plurality of openings includes four openings circumferentially spaced around the cylindrical member.

4. The resonator system of claim 3, wherein the at least one other opening in which the cover plate is positioned is a first opening of the plurality of openings, and each remaining opening of the plurality of openings includes a respective resonator mount therein having the Helmholtz resonator in the at least one resonator port thereof.

5. The resonator system of claim 1, wherein each opening of the plurality of openings and the resonator mount have mating radially inner and outer cross-sectional areas, wherein the radially outer cross-sectional areas of each opening and of the resonator mount are larger than the radially inner cross-sectional areas of the each opening and the resonator mount.

6. The resonator system of claim 1, wherein a radially inner surface of the resonator mount is flush with a radially inner surface of the cylindrical member.

7. The resonator system of claim 1, wherein the resonator mount is removably coupled in the at least one opening of the plurality of openings by a threaded fastener threadedly coupled on a threaded post extending radially outward from the cylindrical member adjacent the at least one opening of the plurality of openings.

8. The resonator system of claim 1, wherein the Helmholtz resonator is removably coupled to the resonator mount by a threaded fastener.

9. The resonator system of claim 1, wherein the resonator mount includes a plurality of cooling passages therein fluidly coupling a source of compressed air outside the combustor liner with the combustion chamber within the combustor liner.

10. The resonator system of claim 1, wherein the cylindrical member further includes a forward portion contiguous with an aft portion, wherein the forward portion is configured to be positioned around the fuel nozzle assembly, and the aft portion extends between the forward portion and the combustor liner.

11. The resonator system of claim 1, wherein the cylindrical member is one of: fixedly coupled to the combustor liner and additively manufactured with the combustor liner.

12. The resonator system of claim 1, wherein the at least one resonator port and the Helmholtz resonator have mating rectangular inner and outer cross-sectional shapes, the rectangular inner and outer cross-sectional shapes having a length thereof extending in a circumferential direction of the cylindrical member.

13. The resonator system of claim 1, wherein the at least one resonator port includes a plurality of resonator ports in the resonator mount in fluid communication with the combustion chamber in the combustor liner, wherein the plurality of resonator ports are longitudinally spaced on the resonator mount.

14. The resonator system of claim 1, wherein the Helmholtz resonator is slidable into the at least one resonator port of the resonator mount.

15. The resonator system of claim 1, wherein the at least one opening in which the resonator mount is removably coupled is a first opening of the plurality of openings, wherein the at least one other opening in which the cover plate is positioned is a second opening of the plurality of openings, and further comprising:
- a resonator test mount configured to be positioned in a third opening of the plurality of openings defined in the wall of the cylindrical member, the resonator test mount including at least one acoustic probe port in fluid communication with the combustion chamber in the combustor liner; and
- an acoustic probe removably coupled in the at least one acoustic probe port of the resonator test mount, the acoustic probe configured to identify the preselected frequency to be dampened at a location of the at least one acoustic probe port in which the acoustic probe is removably coupled.

16. A combustor including the resonator system of claim 1.

* * * * *